(12) United States Patent
Noguchi (10) Patent No.: US 11,010,271 B2
(45) Date of Patent: May 18, 2021

(54) INFORMATION PROCESSING DEVICE, STATUS MONITORING SYSTEM, AND RECORDING MEDIUM

(71) Applicant: FUJI XEROX CO., LTD., Tokyo (JP)

(72) Inventor: Takeshi Noguchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 348 days.

(21) Appl. No.: 16/131,061

(22) Filed: Sep. 14, 2018

(65) Prior Publication Data

US 2019/0227895 A1     Jul. 25, 2019

(30) Foreign Application Priority Data

Jan. 24, 2018    (JP) .............................. JP2018-009488

(51) Int. Cl.
     *G06F 11/30*          (2006.01)
     *G06F 11/32*          (2006.01)
     *H04L 29/08*          (2006.01)
     *H04L 12/24*          (2006.01)

(52) U.S. Cl.
     CPC ...... *G06F 11/3055* (2013.01); *G06F 11/3003* (2013.01); *G06F 11/328* (2013.01); *H04L 41/06* (2013.01); *H04L 41/147* (2013.01); *H04L 67/12* (2013.01); *G06F 2201/80* (2013.01)

(58) Field of Classification Search
     CPC .............. G06F 11/3055; G06F 11/328; G06F 11/3003; H04L 41/147; H04L 41/06; H04L 67/12
See application file for complete search history.

(56) References Cited

U.S. PATENT DOCUMENTS

| | | | |
|---|---|---|---|
| 8,654,360 B2 | 2/2014 | Hatano | |
| 10,274,382 B1 * | 4/2019 | Trundle | G01R 22/06 |
| 2013/0282149 A1 * | 10/2013 | Kuntagod | H04L 67/125 |
| | | | 700/73 |

FOREIGN PATENT DOCUMENTS

| | | |
|---|---|---|
| JP | 5346626 | 11/2013 |
| JP | 2016149058 | 8/2016 |

\* cited by examiner

*Primary Examiner* — Philip C Lee
(74) *Attorney, Agent, or Firm* — Volpe Koenig (57) ABSTRACT

A status monitoring system includes multiple sensors that detect a status of a monitoring target, a transmission unit that transmits changed detection data when detection data detected by the multiple sensors changes, a storage unit that stores the detection data transmitted by the transmission unit, a prediction unit that predicts, from past detection data stored in the storage unit, a time at which the detection data detected by the multiple sensors is predicted to change, and an instruction unit that instructs a specific subset of the multiple sensors to transmit data for checking operation a preset amount of time before the time predicted by the prediction unit.

8 Claims, 9 Drawing Sheets

| SENSOR NUMBER | DETECTION TIME | DETECTION VALUE |
|---|---|---|
| 15 | 2017/9/30/21:10:33 | 14.3°C |
| 21 | 2017/9/30/22:15:48 | 45% |
| 33 | 2017/10/01/09:01:25 | 13.2°C |
| 15 | 2017/10/01/09:01:29 | 9.5°C |
| 11 | 2017/10/01/09:01:30 | 14.2°C |
| 07 | 2017/10/01/09:01:32 | 38% |

FIG. 9

INFORMATION PROCESSING DEVICE, STATUS MONITORING SYSTEM, AND RECORDING MEDIUM

CROSS-REFERENCE TO RELATED APPLICATIONS

This application is based on and claims priority under 35 USC 119 from Japanese Patent Application No. 2018-009488 filed Jan. 24, 2018.

BACKGROUND

(i) Technical Field

The present disclosure relates to an information processing device, a status monitoring system, and a recording medium.

(ii) Related Art

Japanese Patent No. 5346626 discloses a management device provided with a generating unit that generates, for multiple similar logs, a differential log including less information than the original logs from the information included in each of the logs.

Japanese Unexamined Patent Application Publication No. 2016-149058 discloses a resource control system that, on a basis of access log data for each page of a website, derives a page view (PV) prediction formula predicting the variation in the number of PVs at individual times, and changes the resources of the system in accordance with the variation in the number of PVs computed by the PV prediction formula.

SUMMARY

Aspects of non-limiting embodiments of the present disclosure relate to technology in a system that stores only changed detection data after a change occurs among the detection data obtained by multiple sensors, in which even if the status of the target for which to detect detection data changes suddenly, it is possible to prevent an inexpedience of being unable to store relevant detection data.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a status monitoring system including multiple sensors that detect a status of a monitoring target, a transmission unit that transmits changed detection data when detection data detected by the multiple sensors changes, a storage unit that stores the detection data transmitted by the transmission unit, a prediction unit that predicts, from past detection data stored in the storage unit, a time at which the detection data detected by the multiple sensors is predicted to change, and an instruction unit that instructs a specific subset of the multiple sensors to transmit data for checking operation a preset amount of time before the time predicted by the prediction unit.

BRIEF DESCRIPTION OF THE DRAWINGS

An exemplary embodiment of the present disclosure will be described in detail based on the following figures, wherein.

DETAILED DESCRIPTION

Next, an exemplary embodiment of the present disclosure will be described in detail and with reference to the drawings.

Figure 1:
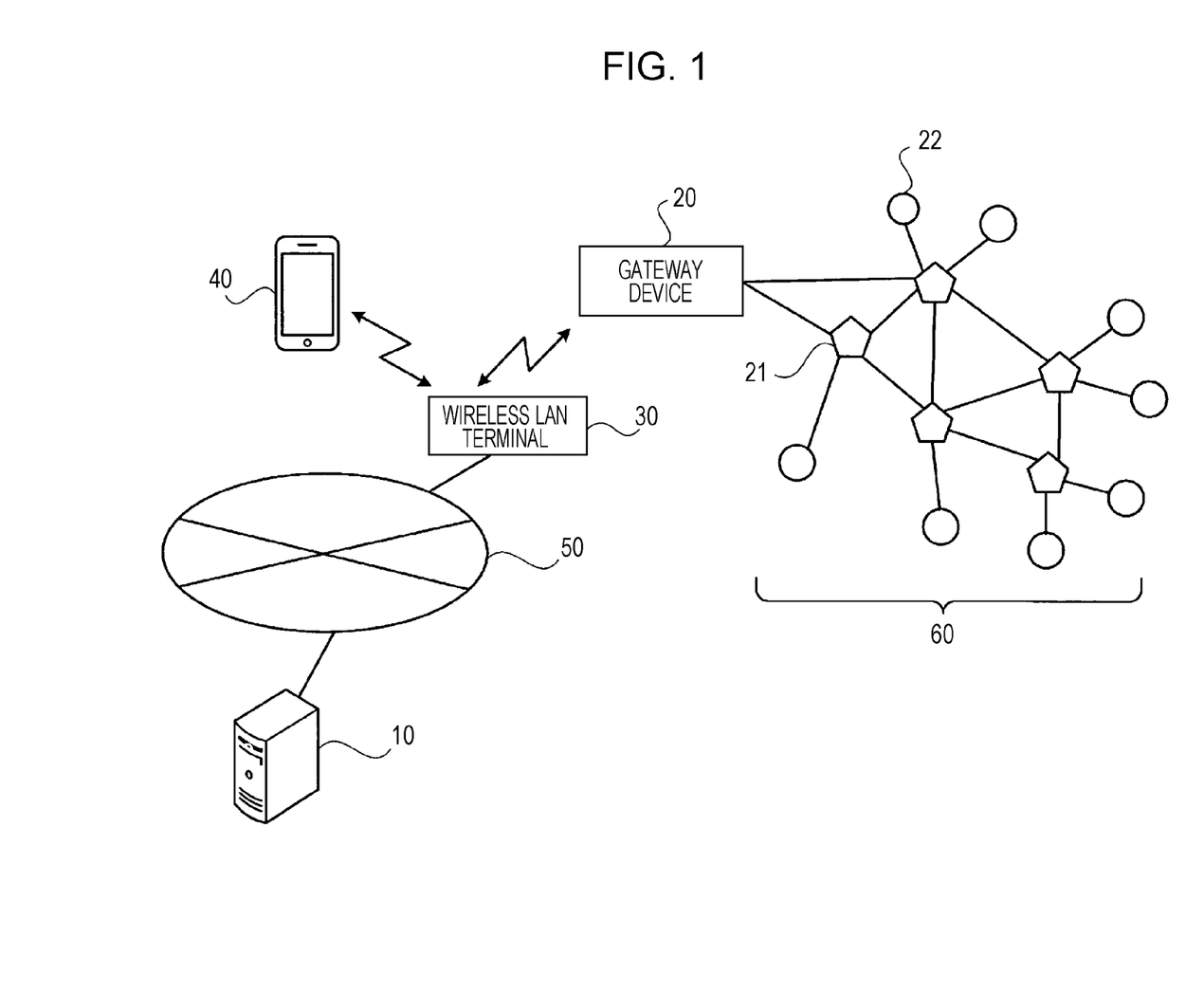
FIG. 1 is a diagram illustrating a system configuration of a status monitoring system according to an exemplary embodiment of the present disclosure.

FIG. 1 is a diagram illustrating a system configuration of a status monitoring system according to the exemplary embodiment of the present disclosure.

As illustrated in FIG. 1, the status monitoring system according to the exemplary embodiment of the present disclosure includes a data storage server 10 and a wireless LAN terminal 30 interconnected by a network 50, a mobile terminal device 40 such as a smartphone, a gateway device 20, and a sensor network 60.

The sensor network 60 is a mesh network containing multiple sensors 21 and 22, such as temperature sensors, humidity sensors, proximity sensors, and acceleration sensors, that detect the status of a monitoring target.

Herein, the sensors 21 and 22 are interconnected by a wireless communication link based on the Bluetooth Low Energy (BLE) standard, which is a low-power communication mode of Bluetooth (registered trademark), a short-range wireless communication standard.

The mesh network technology in the sensor network 60 is one type of technology for routing data among multiple nodes, and is configured such that even if an impediment such as a malfunction occurs and some pathways become unusable, other pathways are utilized to reach the destination, and the forwarding of data among the nodes is maintained.

The data storage server 10 is an information processing device for storing various detection data detected in the sensor network 60.

In the status monitoring system according to the present exemplary embodiment, for example, multiple sensors 21 and 22 are installed inside a store such as a convenience store or a supermarket, various information such as the temperature and humidity inside the store, crowding conditions inside the store, and the movement paths of employees is acquired and stored in the data storage server 10 to thereby monitor the status inside the store.

Note that in the status monitoring system according to the present exemplary embodiment, it is possible to manage not only the room temperature inside the store, but also manage product temperatures by detecting the temperatures of refrigerated or frozen products or the like with the sensors 21 and 22.

Herein, the sensors 21 include a function of forwarding detection data detected by other sensors 21 and 22 to other sensors 22. Meanwhile, the sensors 22 only include a function of forwarding obtained detection data to the sensors 21.

Additionally, any of these multiple sensors 21 are connected to the gateway device 20 by a wireless link conforming to the BLE standard. The gateway device 20 executes protocol conversion between the communication protocol according to which detection data is transmitted and received with respect to the sensors 21 and 22, and the communication protocol of a wireless communication link with the wireless LAN terminal 30.

In addition, the gateway device 20 functions as a communication device that transmits detection data obtained from each of the sensors 21 and 22 to the data storage server 10 via the wireless LAN terminal 30, but in the case in which the detection data detected by the multiple sensors 21 and 22 changes, the gateway device 20 transmits only the changed detection data. In other words, in the case in which the values of the detection data from the sensors 21 and 22 are the same as the values detected at the previous point in time, the gateway device 20 does not transmit the detection data to the data storage server 10.

The gateway device 20 is configured in this way because, for example, if the status of the monitoring target is detected by the sensors 21 and 22 on a preset time interval, such as every 5 minutes, for example, and one attempts to store all of the obtained detection data in the data storage server 10, the amount of data to be stored would become large. Additionally, in the case in which the quantity to monitor is temperature, for example, under conditions when there is little change, such as at night, for example, a status in which the obtained values are the same continues for long periods of time, and thus it is sufficient to store the detection data only when the detection data changes.

Note that it is also possible for the gateway device 20 to take a configuration that, instead of transmitting only the changed detection data, transmits the detection data only when there is a change in the values of the detection data in the sensors 21 and 22.

Also, the connection between the data storage server 10 and the sensors 21 and 22 included in the sensor network 60 is configured such that, in addition to transmitting and receiving detection data, it is also possible to transmit and receive error reports.

Additionally, to reduce power consumption, the data storage server 10 is equipped with a function of switching from a normal operating mode to a low-power mode when the amount of data to process lessens. For this reason, when a status with little to no change in the values of the detection data continues for long periods of time, such as at night or the like, the data storage server 10 switches to low-power mode, and a situation occurs in which the amount of data which is processable at once becomes largely reduced, or data processing stops altogether.

In the case of switching to such a low-power mode, if there is a sudden increase in the amount of detection data being transmitted, since the amount of detection data to be received and stored by the data storage server 10 increases suddenly, there is a possibility that the process of storing all of the received detection data may not be executed, and some detection data may not be stored.

In the status monitoring system according to the present exemplary embodiment, to avoid an inexpedience such as relevant detection data not being stored even in cases where there is a sudden change in the status of the target for which the detection data is detected, a process like the one described later is executed.

Note that the mobile terminal device 40 is also connected to the data storage server 10 via the wireless LAN terminal 30 and the network 50, and the mobile terminal device 40 is configured to be able to read various types of detection data stored in the data storage server 10, and receive notifications from the data storage server 10 when some kind of abnormality occurs.

Figure 2:
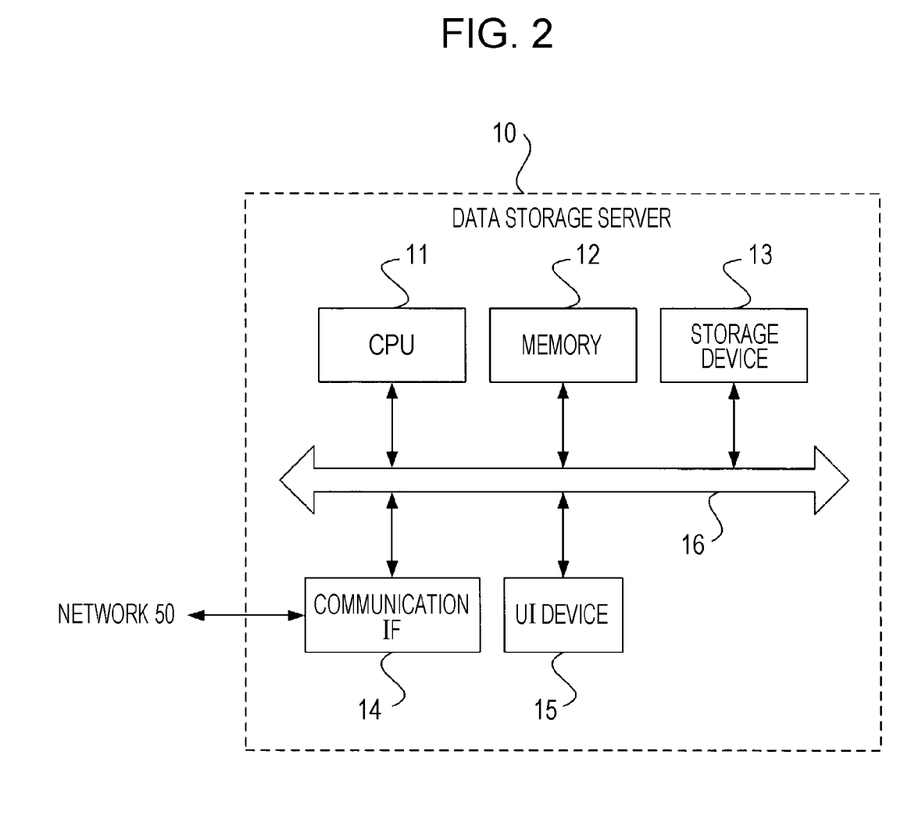
FIG. 2 is a block diagram illustrating a hardware configuration of a data storage server 10 according to the exemplary embodiment of the present disclosure.

Next, FIG. 2 illustrates a hardware configuration of the data storage server 10 in the status monitoring system according to the present exemplary embodiment.

As illustrated in FIG. 2, the data storage server 10 includes a CPU 11, memory 12, a storage device 13 such as a hard disk drive (HDD), a communication interface (IF) 14 that transmits and receives data to and from external devices and the like over the network 50, and a user interface (UI) device 15 including a touch panel or a liquid crystal display and a keyboard. These structural elements are connected to each other by a control bus 16.

The CPU 11 controls the operation of the data storage server 10 by executing predetermined processes on the basis of a control program stored in the memory 12 or the storage device 13. Note that although the present exemplary embodiment describes the CPU 11 reading out and executing a control program stored in the memory 12 or the storage device 13, such a program may also be stored on a storage medium such as CD-ROM and provided to the CPU 11.

Figure 3:
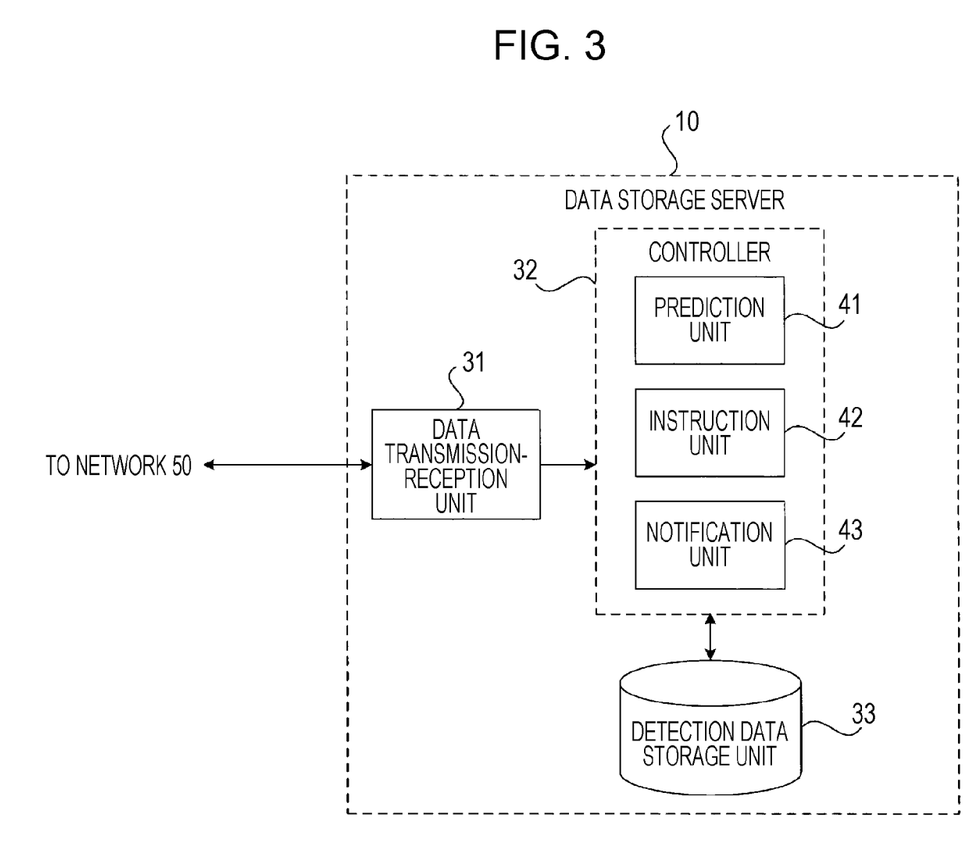
FIG. 3 is a block diagram illustrating a functional configuration of the data storage server 10 according to the exemplary embodiment of the present disclosure.

FIG. 3 is a block diagram illustrating a functional configuration of the data storage server 10 realized by the execution of the above control program.

As illustrated in FIG. 3, the data storage server 10 according to the present exemplary embodiment is provided with a data transmission-reception unit 31, a controller 32, and a detection data storage unit 33. Also, the controller 32 is provided with a prediction unit 41, an instruction unit 42, and a notification unit 43.

The data transmission-reception unit 31 transmits and receives data with the wireless LAN terminal 30 via the network 50.

The controller 32 controls operations of the data storage server 10, such as an operation of storing detection data from the sensors 21 and 22 received via the data transmission-reception unit 31 in the detection data storage unit 33.

Under control by the controller 32, the detection data storage unit 33 stores various types of detection data such as temperature and humidity detected by the sensors 21 and 22 and transmitted by the gateway device 20. Note that since the gateway device 20 is configured to transmit only the changed detection data among the detection data from the sensors 21 and 22 to the data storage server 10, the detection data storage unit 33 stores only the changed detection data transmitted from among the detection data detected by the multiple sensors 21 and 22.

Figure 4:
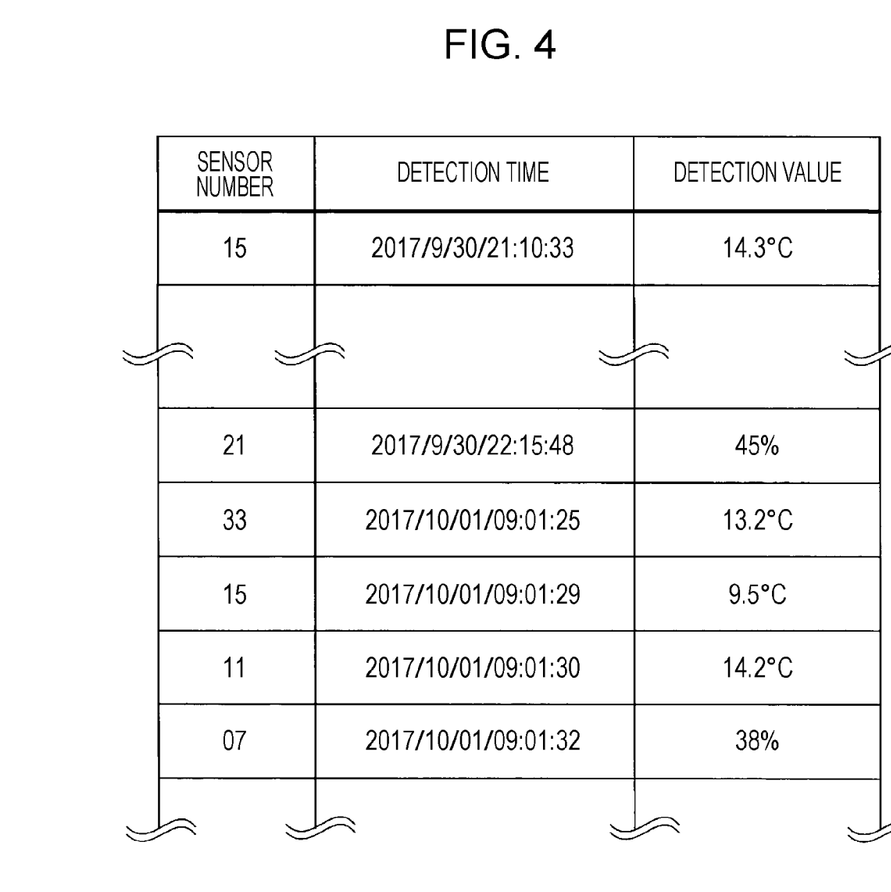
FIG. 4 is a diagram for explaining an example of detection data stored in a detection data storage unit 33.

An example of the detection data stored in the detection data storage unit 33 will be described with reference to FIG. 4. FIG. 4 illustrates how a sensor number for specifying the sensors 21 and 22, a detection time, a detection value, and the like are stored.

From a history of past detection data stored in the detection data storage unit 33, the prediction unit 41 predicts a time when much of the detection data may change among the detection data detected by the multiple sensors 21 and 22. In other words, the prediction unit 41 predicts a time at which, after the status of the detection target has been in a steady status for a long period of time, the status of the detection target may change largely, and the values of the detection data detected by a large number of the sensors 21 and 22 may change suddenly.

Specifically, in cases in which the detection target is a store selling products or the like, it is predicted that the status such as the temperature and humidity may change suddenly after the store's opening time of 9:00 a.m., for example. In other words, during a time period such as nighttime after the store has closed for the day, since there is little to no change in the status such as the temperature and humidity, the values of the detection data remain steady for long periods of time, but when the store's opening time is reached after such a steady status, it is conceivable that many values of the obtained detection data may change.

The instruction unit 42 instructs a specific subset of the sensors among the multiple sensors 21 and 22 to transmit test data for checking operation a preset amount of time before the time predicted by the prediction unit 41. Specifically, the instruction unit 42 instructs sensors having many hops (that is, many forwarding devices en route) to the detection data storage unit 33 from among the multiple sensors 21 and 22 to transmit test data for checking operation a preset amount of time, such as 30 minutes, for example, before the time predicted by the prediction unit 41.

Note that the present exemplary embodiment describes the instruction unit 42 as instructing a subset of sensors 22 having many hops from among the sensors 21 and 22 included in the sensor network 60 to transmit test data.

Also, in the case in which the predicted time at which much of the detection data is predicted to change by the prediction unit 41 is 9:00 a.m., for example, the instruction unit 42 instructs specific sensors 22 to transmit test data 30 minutes ahead of this time, or in other words, at 8:30 a.m.

The notification unit 43 notifies the mobile terminal device 40 of an abnormality in the case in which the test data is not received correctly.

Additionally, the notification unit 43 may also notify a user of the abnormality by causing an announcement unit provided in a subset of the multiple sensors 21 and 22 to operate. Specifically, the user may be notified of the abnormality by causing an LED provided in the sensors 21 and 22 to turn on or off, causing a buzzer or speaker to emit a sound, causing a vibrator to vibrate, announcing an audio message to a nearby user, or the like.

Next, operations of the status monitoring system according to the present exemplary embodiment will be described in detail with reference to the drawings.

First, operations of the data storage server 10 when deciding a predicted time at which to start transmitting test data will be described with reference to the flowchart in FIG. 5.

In the data storage server 10, the prediction unit 41 references past reference data stored in the detection data storage unit 33 (step S101), and predicts a time at which much of the detection data begins to change (step S102).

Subsequently, the instruction unit 42 instructs a specific sensor among the sensors 22 to transmit test data a predetermined amount of time, such as 30 minutes for example, before the time at which much of the detection data begins to change as predicted by the prediction unit 41 (step S103).

Note that the number of sensors instructed by the instruction unit 42 to transmit test data is not limited to one, and the instruction unit 42 may also instruct multiple sensors to transmit test data a predetermined amount of time before the predicted time.

Next, operations during the transmission of test data in a sensor 22 receiving such an instruction will be described with reference to the flowchart in FIG. 6.

In the sensor 22, when the predetermined amount of time before the predicted time indicated by the instruction unit 42 of the data storage server 10 is reached (yes in step S201), test data is transmitted (step S202). The test data is forwarded inside the sensor network 60 and forwarded to the gateway device 20, and then goes from the gateway device 20 through the wireless LAN terminal 30 and the network 50 to arrive at the data storage server 10.

Additionally, in the case in which a reply indicating that the transmitted test data has been received correctly arrives from the data storage server 10 (yes in step S204), in the sensor 22, the transmission of test data is stopped and the process ends.

Also, in the case in which a replay indicating that the transmitted test data has not been received from the data storage server 10 (no in step S204), the sensor 22 repeats the transmission of test data on a preset time interval. Subsequently, in the case in which the number of test data transmission has exceed a predetermined number of times (yes in step S203), the sensor 22 stops the transmission of test data, and issues an error notification indicating that there is some kind of abnormality in the system (step S205).

For the error notification issued by the sensor 22, information indicating that there is some kind of abnormality in the system may be transmitted from the sensor 22 to the data storage server 10, and an LED provided on the sensor 22 may also be made to blink or the like to notify a user of the abnormality.

Next, operations of the data storage server 10 when receiving test data transmitted from the sensors 22 by operations like the above will be described with reference to the flowchart in FIG. 7.

The data storage server 10 stands by waiting to receive test data or an error notification from the sensors 22 (steps S301, S302). Subsequently, in the case of receiving test data from the sensors 22 (yes in step S302), the data storage server 10 transmits to the sensors 22 a reply indicating that test data has been received correctly (step S303). Note that at this time, the data storage server 10 receiving the test data returns from the low-power mode to the normal operating mode.

Additionally, in the case of receiving an error notification from the sensors 22 (yes in step S301), the data storage server 10 reports to the user that there is some kind of abnormality in the system by forwarding the notification to the mobile terminal device 40, for example (step S304).

Subsequently, in the case in which the user does not issue an instruction to continue operation and instead issues an instruction to stop the system via the mobile terminal device 40 (no in step S305), the data storage server 10 stops operation and aborts detection data storage operations (step S306).

Figure 5:
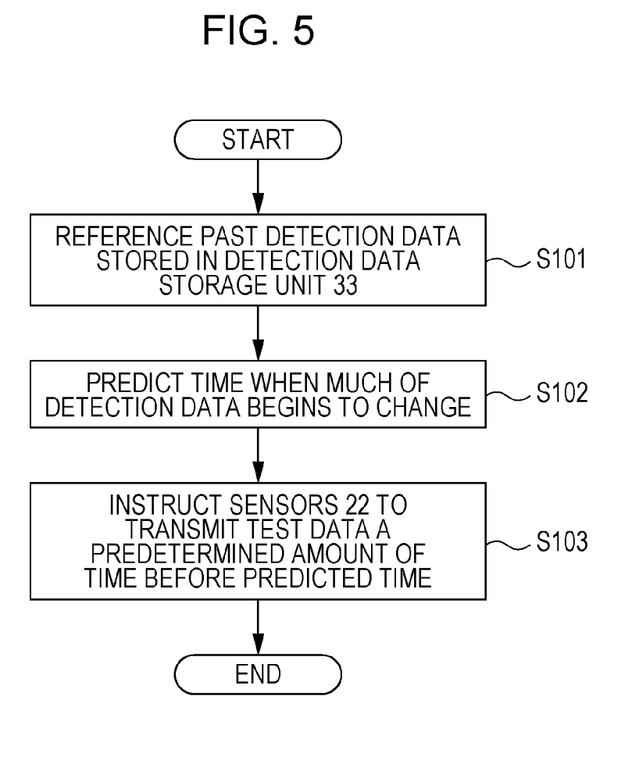
FIG. 5 is a flowchart for explaining operations of the data storage server 10 when deciding a predicted time at which to start transmitting test data.
Figure 6:
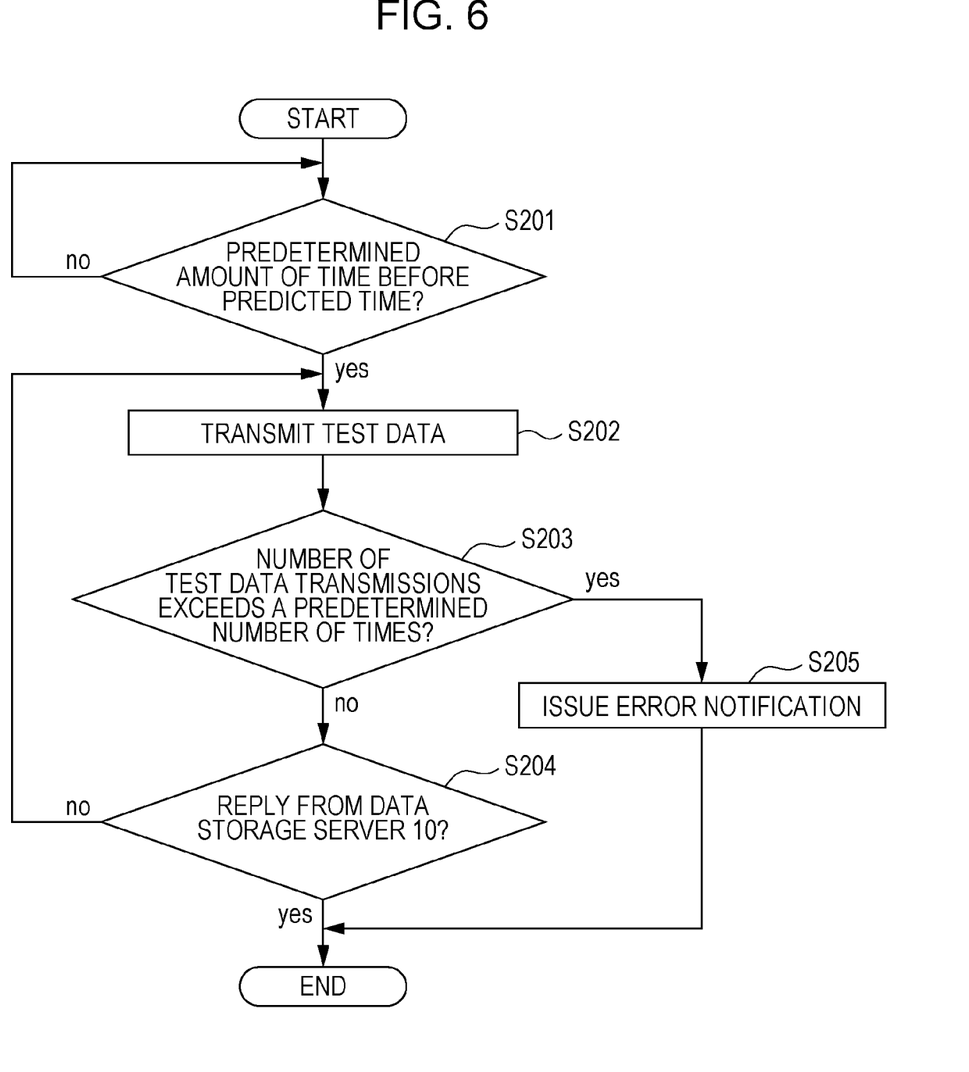
FIG. 6 is a flowchart for explaining operations when transmitting test data in sensors 22.
Figure 7:
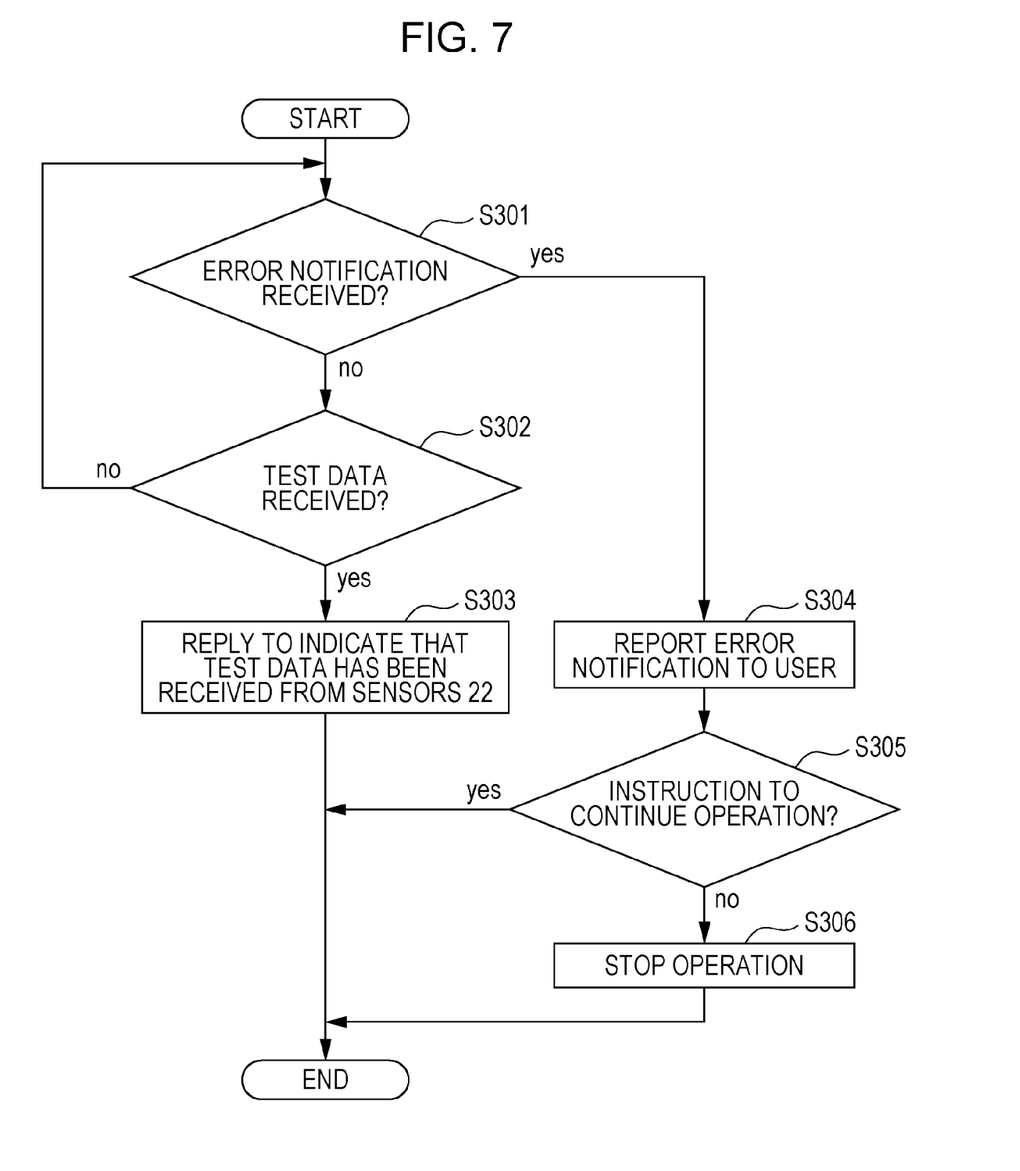
FIG. 7 is a flowchart for explaining operations of the data storage server 10 when receiving test data transmitted from the sensors 22.

In the flowcharts of FIGS. 5 to 7 described above, a time at which much of the detection data may change is predicted from history information regarding past detection data in the data storage server 10.

Figure 8:
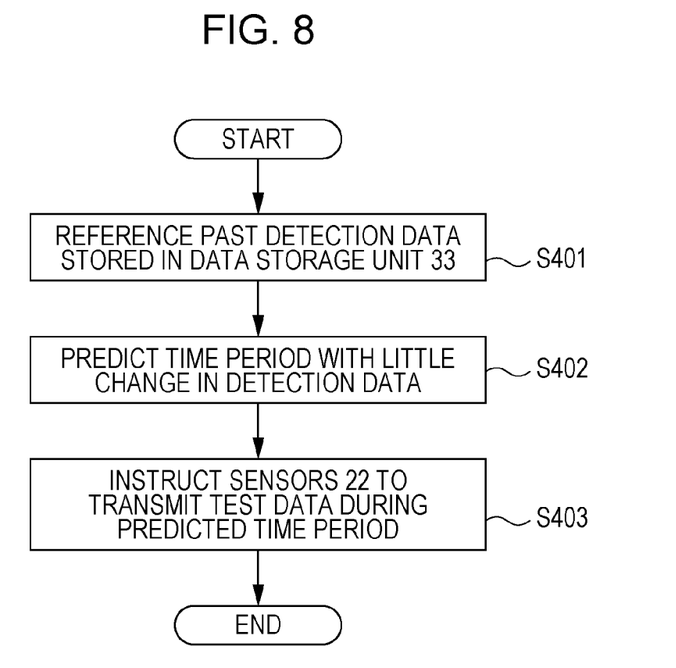
FIG. 8 is a flowchart for explaining operations of the data storage server 10 when deciding a time period during which to transmit test data.
Figure 9:
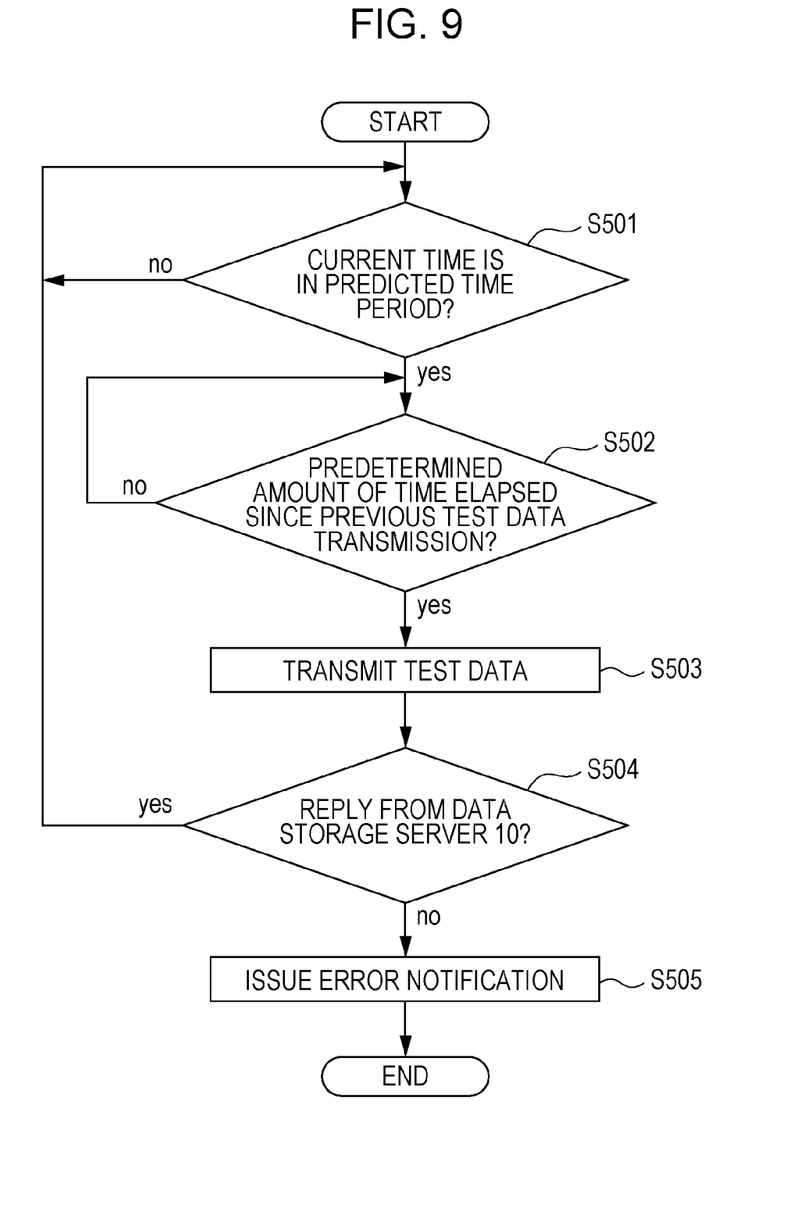
FIG. 9 is a flowchart for explaining operations when transmitting test data in the sensors 22.

In contrast, hereinafter, FIGS. 8 and 9 will be referenced to describe a case in which the data storage server 10 determines a time period during which there is little change in the detection data from the history information regarding past detection data, and test data is transmitted from the sensors 22 during this time period.

First, operations of the data storage server 10 when deciding a time period during which to transmit test data will be described with reference to the flowchart in FIG. 8.

In the data storage server 10, the prediction unit 41 references past reference data stored in the detection data storage unit 33 (step S401), and predicts (determines) a time period during which there is little change in the detection data (step S402).

Subsequently, the instruction unit 42 instructs one or more specific sensors among the sensors 22 to transmit test data in the time period during which there is little change in the detection data as predicted by the prediction unit 41 (step S403).

Next, operations during the transmission of test data in a sensor 22 receiving such an instruction will be described with reference to the flowchart in FIG. 9.

In the sensor 22, when the time period indicated by the instruction unit 42 of the data storage server 10 is reached (yes in step S501), and a predetermined amount of time, such as one hour for example, has elapsed since the previous transmission of test data (yes in step S502), test data is transmitted (step S503). The test data is forwarded inside the sensor network 60 and forwarded to the gateway device 20, and then goes from the gateway device 20 through the wireless LAN terminal 30 and the network 50 to arrive at the data storage server 10.

Subsequently, if a reply indicating that the transmitted test data has been received correctly arrives from the data storage server 10 (yes in step S504), in the case in which the current time is in the predicted time period, the sensor 22 transmits test data at intervals of the predetermined amount of time (steps S501 to S503).

Subsequently, in the case in which a reply indicating that the transmitted test data has been received correctly does not arrive from the data storage server 10 (no in step S504), the sensor 22 issues an error notification indicating that there is some kind of abnormality in the system (step S505).

Note that since the operations of the data storage server 10 when receiving test data transmitted from the sensors 22 in this way are similar to the flowchart illustrated in FIG. 7, a description is omitted.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A status monitoring system comprising:
   a plurality of sensors that detect a status of a monitoring target;
   a transmission unit that transmits changed detection data when detection data detected by the plurality of sensors changes;
   a storage unit that stores the detection data transmitted by the transmission unit; and
   a processor configured to:
   predict, from past detection data stored in the storage unit, a time at which the detection data detected by the plurality of sensors is predicted to change,
   instruct a specific subset of the plurality of sensors to transmit data for checking operation a preset amount of time before the time predicted,
   receive a reply from the storage unit that the data was received, and switch the storage unit from a low-power mode state to a normal operating power mode state,
   on a condition that the data transmitted is not received by the storage unit, issue an error notification, and
   determine if a message is received, and when the message is received, issue an instruction to continue as if the reply was received.

2. The status monitoring system according to claim 1, wherein
   the plurality of sensors are interconnected by a mesh network.

3. The status monitoring system according to claim 2, wherein
   the plurality of sensors are interconnected wirelessly in the mesh network.

4. The status monitoring system according to claim 2, wherein
   the processor instructs one or more sensors having many hops to the storage unit from among the plurality of sensors to transmit the data for checking operation a preset amount of time before the time predicted.

5. The status monitoring system according to claim 1, wherein
   the processor issues a notification indicating an abnormality in a case in which the data for checking operation is not received correctly.

6. The status monitoring system according to claim 5, wherein
   the processor issues the notification indicating an abnormality by causing an announcement unit provided in a subset of the plurality of sensors to operate.

7. An information processing device comprising:
   a storage unit that stores changed detection data transmitted from among detection data detected by a plurality of sensors that detect a status of a monitoring target; and
   a processor configured to:
   predicts, from past detection data stored in the storage unit, a time at which the detection data detected by the plurality of sensors is predicted to change,
   instruct a specific subset of the plurality of sensors to transmit data for checking operation a preset amount of time before the time predicted,
   receive a reply from the storage unit that the data was received, and switch the storage unit from a low-power mode state to a normal operating power mode state,
   on a condition that the data transmitted is not received by the storage unit, issue an error notification, and
   determine if a message is received, and when the message is received, issue an instruction to continue as if the reply was received.

8. A non-transitory computer readable medium storing a program causing a computer to execute a process for monitoring a status of a monitoring target, the process comprising:

storing, via a storage unit, changed detection data transmitted from among detection data detected by a plurality of sensors that detect the status of the monitoring target;

predicting, via a processor, from stored past detection data, a time at which the detection data detected by the plurality of sensors is predicted to change;

instructing, via the processor, a specific subset of the plurality of sensors to transmit data for checking operation a preset amount of time before the predicted time; and receiving, via the processor, a reply from the storage unit that the data was received, and switch the storage unit from a low-power mode state to a normal operating power mode state;

on a condition that the data transmitted is not received by the storage unit, issuing, via the processor, an error notification, and     determining, via the processor, if a message is received, and when the message is received, issue an instruction to continue as if the reply was received.

\* \* \* \* \*